United States Patent [19]

D'Auria et al.

[11] Patent Number: 4,668,044
[45] Date of Patent: May 26, 1987

[54] OPTOELECTRONIC COUPLER FOR OPTICAL FIBERS PROVIDING ADJUSTABLE LIGHT-ENERGY EXTRACTION AND A BIDIRECTIONAL DATA TRANSMISSION SYSTEM FOR PRACTICAL APPLICATION OF THE COUPLER

[75] Inventors: Luigi D'Auria, Sceaux; Claude Puech, Longjumeau; Chantal Moronvalle, Chevilly Larue, all of France

[73] Assignee: Thomson-CSF, Paris, France

[21] Appl. No.: 703,886

[22] Filed: Feb. 21, 1985

[30] Foreign Application Priority Data

Feb. 24, 1984 [FR] France ................... 84 02854

[51] Int. Cl.⁴ .......................... G02B 6/26; H01J 5/16
[52] U.S. Cl. ....................... 350/96.15; 250/227; 350/96.20; 455/612

[58] Field of Search ............... 350/96.15, 96.16, 96.20, 350/96.21, 96.29; 250/227; 455/610, 612

[56] References Cited

U.S. PATENT DOCUMENTS 4,493,113 1/1985 Forrest et al. .................. 455/607 X Primary Examiner—John Lee
Attorney, Agent, or Firm—Oblon, Fisher, Spivak, McClelland & Maier

[57] ABSTRACT

A coupler comprising a photodiode having a central passage and fitted on the end portion of a first optical fiber which is rigidly fixed to a casing, a second optical fiber being rigidly fixed to a sleeve slidably fitted within the casing and having an end-face located at an adjustable distance from an end-face of the first optical fiber and from the photodiode in order to adjust the light-energy extraction rate to a predetermined value, and comprising means for adjusting the spacing between fibers.

8 Claims, 4 Drawing Figures

OPTOELECTRONIC COUPLER FOR OPTICAL FIBERS PROVIDING ADJUSTABLE LIGHT-ENERGY EXTRACTION AND A BIDIRECTIONAL DATA TRANSMISSION SYSTEM FOR PRACTICAL APPLICATION OF THE COUPLER

BACKGROUND OF THE INVENTION

1. Field of the Invention

The present invention relates to an optoelectronic coupler for optical fibers in which possibilities are provided for extracting an adjustable fraction of the light energy carried by a wave which is guided by said optical fibers, especially for a bidirectional data-transmission system.

2. Description of the Prior Art

This type of optical component is employed extensively in optical-fiber data-transmission systexs. In particular, when bidirectional transmission takes place between two stations coupled by means of an optical-fiber channel link, it is necessary to transmit a data-carrying light wave from a first station to a second station via said channel link. The second station transmits return data by means of a wave which is guided by the safe channel link. It is then necessary to extract all or part of the light energy carried by said guided wave.

The energy extraction rate usually has to be adjusted in order to take into account many optoelectronic parameters associated on the one hand with the channel links between stations and on the other hand with the stations themselves.

Furthermore, when the configuration of the system is subject to modifications, readjustments have to be made in order to take these modifications into account.

Finally, in certain transmission systems, the links are not symmetrical. This is generally the case, for example, with the so-called teledistribution networks.

Teledistribution is already in widespread use in certain countries and is expected to develop at a higher rate over the next few years. This development is facilitated by the use of optical-fiber transmission cables.

In the most simple types of teledistribution networks, a central station transmits via a transmission cable connected to subscriber stations either one or a number of television programs, AM/FM radio broadcasting prograxs and even messages for private subscribers. Selection is carried out by making use of filters in order to tune the subscriber's receiver to a predetermined frequency band associated with a particular program. In the mcre elaborate networks, bidirectional transmission systexs are employed. In addition to the facilities mentioned in the foregoing, these networks permit the connection of equipment such as telex devices, for example, to the teledistribution system. The subscriber can accordingly transmit orders to the central station for selecting a particular program (TV, AM/FM) which will alone be transmitted to the subscriber, transmit orders relating to the other available services, or transmit his own signals.

Transmission of video signals calls for high bit-rate communication links or, equivalently, wide-band links. In the field of teledistribution, the links initially employed consisted of electric cables of the coaxial type, for example. In order to provide a higher bit rate, it is an advantage to replace these electrical links by optical-fiber links.

On the other hand, the signals transmitted by the subscriber usually occupy only a limited frequency-band for this type of application.

Furthermore, the emitting power of light sources is usually lower in subscriber stations than at the central station.

It is therefore necessary to provide couplers having an adjustable energy-extraction rate. It is further apparent from the foregoing that these couplers must provide a wide range of adjustment if it is desired for reasons of standardization and economy to employ the smallest possible number of separate components.

In the prior art, a number of different approaches have been proposed for the construction of an optical coupler which provides a variable light-energy extraction rate.

A first approach was described in U.S. Pat. No. 4,103,154. The device described in this specification comprises two bundles of optical fibers connected optically by means of a single optical fiber having a cross-sectional area substantially equal to the cross-sectional area of the fiber bundles, mechanical coupling being achieved by means of male and female connectors. The single fiber has a core and a cladding. A window is forxed in the cladding, the area of said window being determined as a function of the optical power to be derived. A conventional photodiode consisting of a base surmounted by a photodetector chip which determines the light-detecting surface area is provided opposite to said window. A drop of a bonding product is deposited on the detecting surface and the assembly is bonded to the single optical fiber at the level of the window formed in the fiber cladding.

The method of formation of said window consists in removal by abrasion of part of the optical fiber cladding material. By rubbing a cylinder against the cladding, a substantially elliptical opening is thus obtained. The portion of fiber core which has thus been bared is then polished. Thus a fraction of the radiation which arrives on the interface between the fiber core and the bonding material is transmitted by said material to the detecting face of the photodiode. As the opening formed in the cladding and occupied by the bonding material is of greater area, so the detected fraction of incident radiation is larger. These arrangements therefore permit adjustxent of the derived fraction of optical power at the time of fabrication but fail to permit an adjustment operation proper and especially an adjustment in situ.

A second approach was described in an article by Gfeller and Bapst which appeared in "Electronics Letters", Vol. 15, July 19th, 1979, pages 448–450.

It is known that, in the case of an emergent guided wave, the end face of an optical fiber behaves as a source of divergent light. By virtue of the symmetry of revolution of an optical fiber, the output beam is a conical beam having an axis of symmetry which coincides with the optic axis of the optical fiber and having a gaussian distribution in a radial direction.

If a second optical fiber having an optic axis which coincides with that of the first fiber is placed in oppositely-facing relation, depending on the distance between the end-faces of the two fibers, the angle of incidence of part of the light rays on the entrance face of the second fiber is larger than the ultimate value which permits guidance of the light wave within the core of the second fiber.

In the article cited above, it is proposed to place around the second optical fiber a waveguide tube for capturing the light rays which escape from the fiber core and for guiding them towards the exterior of a connector and finally, after reflection from a beveled external face of said tube, the light rays are detected by means of a photodetector located outside the connector.

Apart from the fact that the method adopted results in a fairly complex structure, it is not possible to vary the energy-extraction rate to a substantial extent and part of the energy emitted by the end-face of the first optical fiber is employed or in other words is neither guided by the second optical fiber nor extracted.

SUMMARY OF THE INVENTION

The aim of the present invention is to overcome the difficulties of the prior art.

Accordingly, the invention is directed to an optoelectronic coupler for optical fibers of the type involving extraction of an adjustable fraction of light energy of an incident wave carried by a first optical fiber for transmitting said fraction to an optoelectronic detection device and for transmitting all or part of the remaining light energy to a second optical fiber, the end-faces of the first and second optical fibers being placed in oppositely-facing relation in order to be optically coupled. The distinctive feature of the optoelectronic coupler lies in the fact that the optoelectronic detection device is a photodiode having the structure of a circular disk pierced by a central passage, said disk being fitted on one end of the second optical fiber and provided with an active annular receiving face located opposite to that end-face of the first optical fiber which is in oppositely-facing relation to the end-face of said second optical fiber. Said coupler comprises means for positioning said end-faces in oppositely-facing relation at a predetermined distance from each other in such a manner as to ensure that the optoelectronic coupler provides an adjustable energy-extraction rate.

The invention is also concerned with a bidirectional transmission system for the practical application of said coupler.

BRIEF DESCRIPTION OF THE DRAWINGS

Other features of the invention will be more apparent upon consideration of the following description and accompanying drawings, wherein.

DETAILED DESCRIPTION OF THE INVENTION

Figure 1:
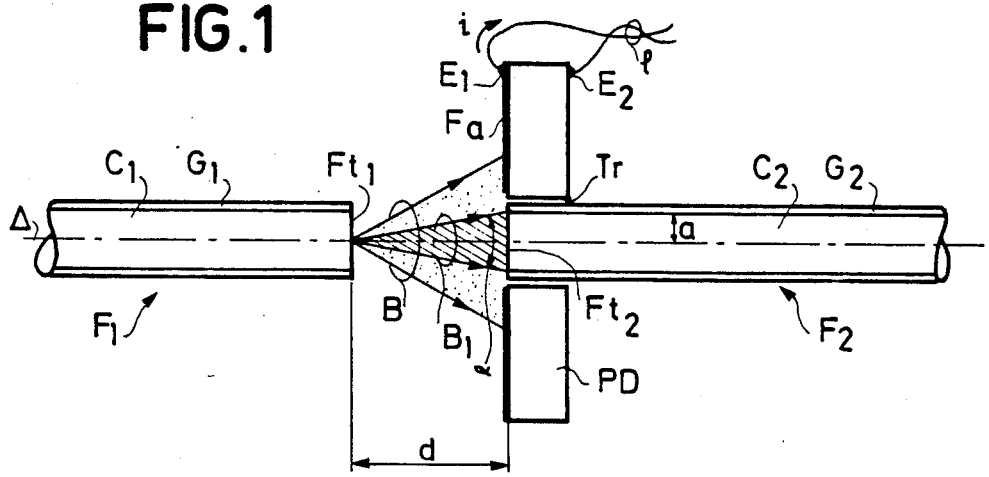
FIG. 1 is a schematic illustration of an optical coupler in accordance with the invention and providing an adjustable light-energy extraction rate.

FIG. 1 is a schematic representation of an optical coupler in accordance with the invention and providing an adjustable light-energy extraction rate.

Two optical fibers $F_1$ and $F_2$ having a common optic axis $\Delta$ are spaced at an adjustable distance d.

In accordance with the known practice recalled earlier, the optical fiber $F_1$ into which a light wave has been injected and guided by the fiber core $C_1$ behaves as a divergent light source at the fiber end-face $Ft_1$ located opposite to the end-face $Ft_2$ of the optical fiber $F_2$. The emitted light beam is bounded by a cone having an axis of symmetry which coincides with the common optic axis $\Delta$.

Depending on the distance d between the two end-faces $Ft_1$ and $Ft_2$, only a light beam inscribed in a cone $B_1$ having a vertex angle $\alpha$ is a useful beam, that is, a beam trapped and guided by the core $C_2$ of the optical fiber $F_2$. The angle $\alpha$ decreases in value when the distance d increases.

In accordance with the most important feature of the invention, an optoelectronic detection element PD is fitted over the end portion of the optical fiber $F_2$ and a circular cavity $T_r$ having the same diameter as the external diameter of the optical fiber $F_2$ is formed in a central zone of said optoelectronic element.

Figure 2:
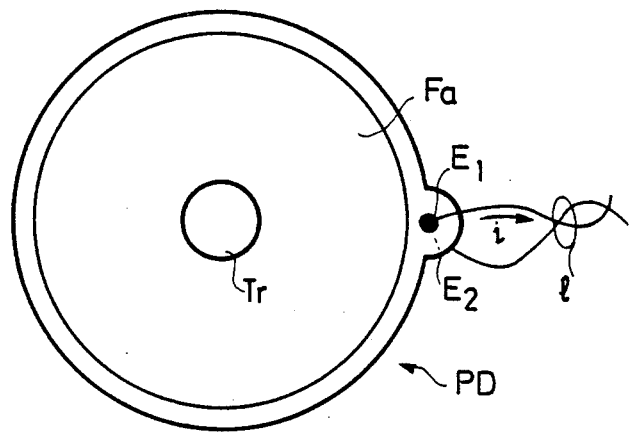
FIG. 2 illustrates a hole-type photodiode employed within the field of the invention.

In a preferred alternative embodiment, said optoelectronic element consists of a photodiode having an annular structure as shown in the front view of FIG. 2. Said photodiode has an active face Fa of annular shape, the internal diameter of which is equal to the external diameter of the optical fiber $F_2$.

The photodiode can be fabricated in a conventional manner. The central cavity can then be formed simply by selective chemical etching of the central region.

The photodiode PD is provided with two electrodes $E_1$ and $E_2$ for collecting the current i produced by conversion of the light energy received by the active face Fa, said electrodes being connected to optical connectors 1.

The active face Fa receives the light energy of a beam which is bounded by the conical envelopes $B_1$ and B. This energy represents the extraction carried out, in which the amplitude or rate of extraction increases when the distance d increases.

If $P_O$ is the optical power delivered by the active end-face $Ft_1$ of the fiber $F_1$ and if $P_c$ is the optical power coupled to the optical fiber $F_2$, that is to say the power corresponding to the wave guided by the core $C_2$ of said fiber, the photodiode PD detects an optical power equal to $(P_O - P_c)$ under zero-loss conditions.

The light-energy extraction rate expressed as a percentage can be represented by the following relation:

$$\tau = \frac{P_O - P_c}{P_O} = 1 - \frac{P_c}{P_O} \qquad (1)$$

or else as a function of the distance d:

$$\tau = 1 - \left(\frac{a}{a + d \cdot \mathrm{tg}\theta_c}\right)^2 \qquad (2)$$

In relation (2), a is the core radius of the optical fibers $F_1$ and $F_2$ and $\theta_c = \arcsin(ON)$, where ON is the numerical aperture. Strictly speaking, relation (2) is valid only in the case of optical fibers which exhibit an abrupt index change and uniform energy distribution in all possible propagation modes. In addition, if the thickness of the optical cladding $G_2$ of the optical fiber $F_2$ is negligible, the cladding $G_1$ of the optical fiber $F_1$ does not play any part.

The result just mentioned can be obtained in practice by carrying out chemical etching of the end region of the optical fiber $F_2$ on which the photodiode PD is fitted. It should be understood that the active face Fa is coplanar with the end-face Ft₁ of the fiber F₂ in order to limit any additional cause of losses.

A conventional method for carrying out a reduction in diameter at the end of an optical fiber consists in etching this latter in a hydrofluoric acid solution. By way of example, a 40% solution is employed and the cladding is etched over a length of approximately 1 centimeter. The operation can be performed at room temperature. However, the fiber core is etched at the outset by the hydrofluoric acid.

In order to prevent etching of the fiber core, the core has to be protected with wax which is subsequently removed. Since the rate of etching of the cladding is known (approximately 1 micrometer per minute), the time required may accordingly be determined. In addition, continuous checking of the diameter can be perforxed. Once the desired diameter has been attained, the fiber is rinsed.

By means of this method, the thickness of the optical cladding can be reduced to a value of less than a few micrometers and is virtually negligible.

In order to help fix ideas, it may be noted by way of example that, in the case of an optical fiber $F_2$ having a diameter $2a = 85$ micrometers and a numerical aperture $ON = 0.2$, the light-energy extraction rate is equal to:

$$\tau = 1 - \left(\frac{42.5}{42.5 - 0.2d}\right)^2.$$

The distance d can also be expressed as a function of the extraction rate $\tau$ which is fixed beforehand:

$$d = 5(42.5 \times (1/(1-\tau)) - 42.5) \tag{3}$$

In order to produce a variation in the energyextraction rate between 90% and 10%, the distance d between the end-faces Ft₁ and Ft₂ must vary between approximately 460 micrometers ($\tau = 90\%$) and 11.5 micrometers ($\tau = 10\%$), namely a total variation of approximately 450 micrometers.

The amplitude of the current i represents the energy-extraction rate.

Figure 3:
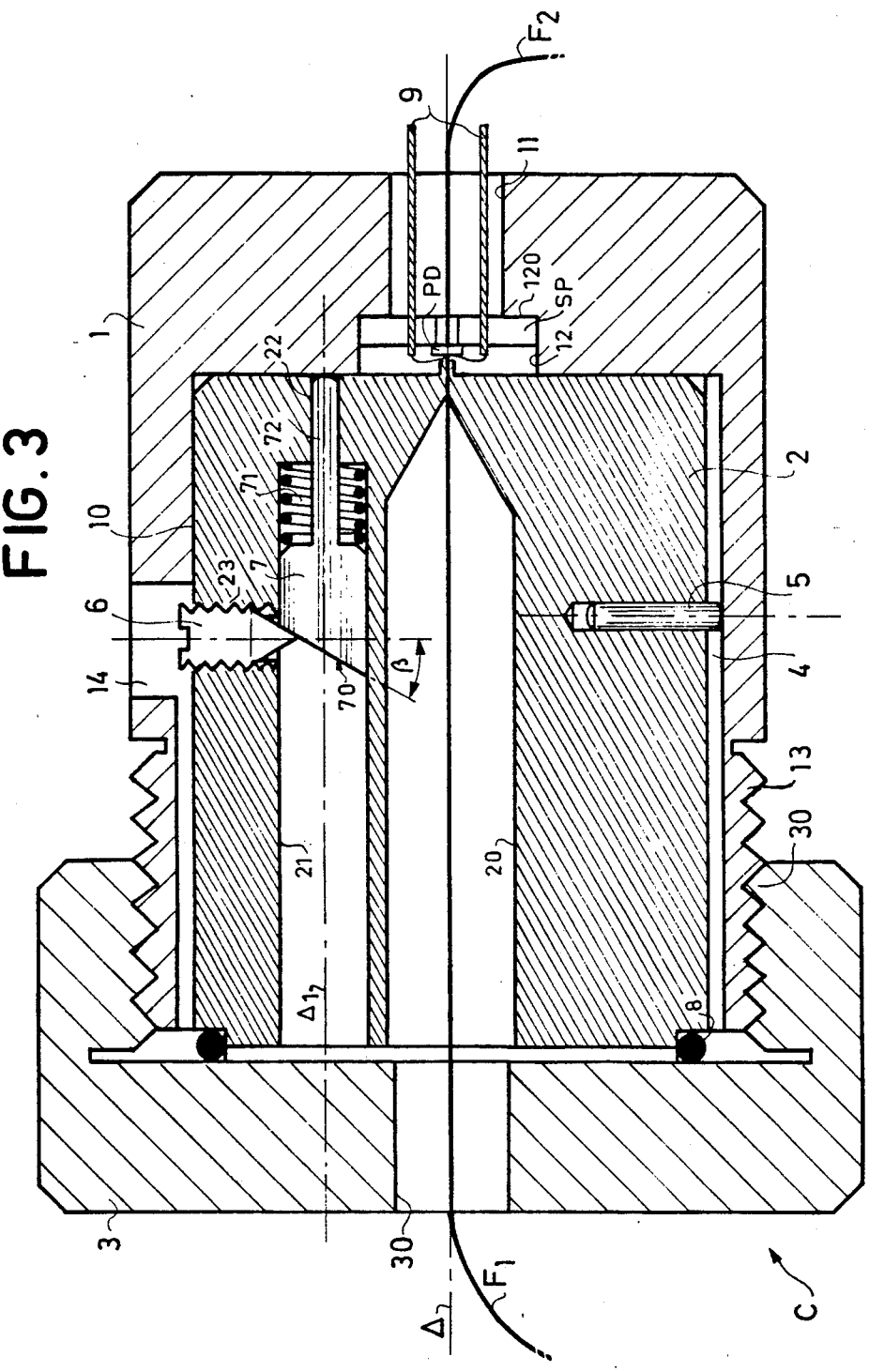
FIG. 3 illustrates a specific example of construction of a coupler in accordance with the invention.

FIG. 3 is a cross-sectional view of a specific form of construction of an optical coupler which provides an adjustable light-energy extraction rate and incorporates the arrangements in accordance with the invention.

Elements which are identical with those shown in FIGS. 1 and 2 are designated by the same references and will not be described further.

The fiber F₁ is maintained in position by means of a cylindrical sleeve 2 and extends along the axis of symmetry of said sleeve. Said axis of symxetry coincides with the optic axis Δ which is common to the two fibers F₁ and F₂ to be coupled.

Said cylindrical sleeve 2 is slidably fitted within a component 1 having a cavity 10, the internal wall of which is also cylindrical. The diameters of the two components are adjusted so as to ensure the minimum tolerance which is compatible with the standards of accuracy required for optical coupling and is typically less than 5 micrometers.

The cylindrical sleeve has an axial cavity 20 and the optical fiber F₁ is maintained in position only at the end located opposite to the corresponding end portion of the optical fiber F₂.

Said fiber F₂ is inserted in the central cavity T, (shown in FIGS. 1 and 2) of the photodiode PD which is secured to the component 1. To this end, said component 1 has a double cavity 12-11 which passes through the end-wall of said component and forms an extension of the main cavity 10. The diameter of the cavity 12 is slightly larger than the external diameter of the photodiode disk PD. The diameter of the cavity 11 is smaller than that of the cavity 12 in order to ensure that the peripheral portion of the photodiode PD rests on the end-wall 120 of the cavity 12. Conductors 9 connected to the electrodes E₁ and E₂ by the connectors 1 (FIGS. 1 and 3) serve to transmit the signal (i) from the photodiode PD to conventional processing circuits (not shown in the drawings).

The optical fibers F₁ and F₂, the photodiode PD and the electrical conductors 9 can be secured by conventional jointing means.

The component 1 can be provided at the open end thereof with a threaded portion 13 formed on its external wall and with an end-cap 3 which is provided with an internal screw-thread and can be screwed onto the component 1. An axial opening 30 is formed in said end-cap and the optical fiber F₁ emerges from said opening.

The design function of said end-cap is to lock the sleeve 2 in the bottom of the cavity 10 by means of a resilient O-ring seal 8.

The internal wall of the cavity 10 has a longitudinal groove 4 in which is engaged a stud 5. Said stud is rigidly fixed to the sleeve 2 and serves to guide this latter in translational motion in a direction parallel to the axis Δ. Said stud 5 also serves as a locating key for ensuring correct relative positioning of the sleeve 2 and casing 1.

As can readily be understood, accuracy of machining of the components must be made to correspond to the accuracy of alignment of the fibers F₁ and F₂ according to the requirements of the practical application under consideration and is typically less than 5 micrometers.

The sleeve 2 has a second longitudinal cavity 21 which is located off-center with respect to the axis Δ but is disposed in a direction A which is parallel to said axis.

A piston 7 is capable of displacement within the longitudinal cavity 21 which has just been mentioned.

An additional cavity 22 forming an extension of said cavity 21 serves to establish a communication between this latter and the exterior of the sleeve at that end of said sleeve which is located in oppositely-facing relation to the end-wall of the cavity 10, the diameter of said cavity 22 being smaller than the diameter of said cavity 21.

The piston is also provided with an extension in the form of a stud 72 which is slidably fitted within the cavity 22 and is applied against the end-wall of the cavity 10.

A spring 71 is placed between the piston 7 and the end-wall of the cavity 21 and exerts a thrust on said piston.

Finally, an internally-threaded bore 23 is pierced in the wall between the exterior of the sleeve 2 and the cavity 21 and a screw 23 is engaged within said bore.

An additional orifice 14 forming a port is pierced in the wall of the component 1 in order to allow freedom of access to the aforementioned screw 23.

The conical tip of said screw 23 is applied against a flat, beveled end-face 70 of the piston 7. Said beveled end-face is inclined with respect to the axis A at an angle $\beta$ which differs by $(\pi/2)$ radians.

Depending on the extent of downward engagement of the screw 6 within its bore 23, the piston 7 also exerts a proportional thrust on the end-wall of the cavity 10 and thus produces a translational displacement of the sleeve along the axis Δ whilst the conical tip of the screw slides over the beveled end-face 70 of the piston.

When the screw 6 is displaced in the downward direction within its bore, the sleeve 2 moves away from the end-wall of the cavity 10 and the other end of the sleeve thus compresses the resilient O-ring seal 8 as well as the faces $Ft_1$ and $F_t$ of the optical fibers $F_1$ and $F_2$. The permissible amplitude of compression must be sufficient to permit variations in the light-energy extraction rate within a predetermined range as described earlier.

In the opposite direction, when the screw 6 is displaced within its bore in the outward direction, the spring 71 thrusts back the sleeve 2 towards the end-wall of the cavity 10 and the end-faces $Ft_1$ and $Ft_2$ of the optical fibers $F_1$ and $F_2$ are drawn closer together.

In order to give a clear idea, if the movement of rotation of the screw 6 results in a displacement of its conical tip in a direction at right angles to the axis Δ in a ratio of 350 micrometers per revolution and if the translational displacement of the piston 7 is set at a value of 10 micrometers per quarter of a revolution of the screw 6, then the beveled end-face of the piston is inclined at an angle β with respect to a direction at right angles to the axis $Δ_1$ which is equal to 6.5° (0.11 radian).

The arrangement thus adopted, that is to say the cooperation of screwing means with the inclined plane of the piston, is therefore conducive to a high standard of accuracy in the definition of the distance d between the two end-faces of the optical fibers $F_1$ and $F_2$.

Within the scope of the example defined in the foregoing, the amplitude of displacement thus obtained is 460 micrometers per 11.5 revolutions of the screw.

Typically, the photodiode PD can be provided with the following characteristics:
type: silicon PIN diode;
external diameter (active face Fa): approximately 1 mm;
sensitivity: approximately 0.5 A/W at a wavelength equal to 0.85 micrometer;
electrical capacitance: smaller than 5 pF.

As recalled earlier, the optical coupler providing an adjustable light-energy extraction rate in accordance with the invention finds an advantageous application in data transmission systems of the dissymmetrical type.

Figure 4:
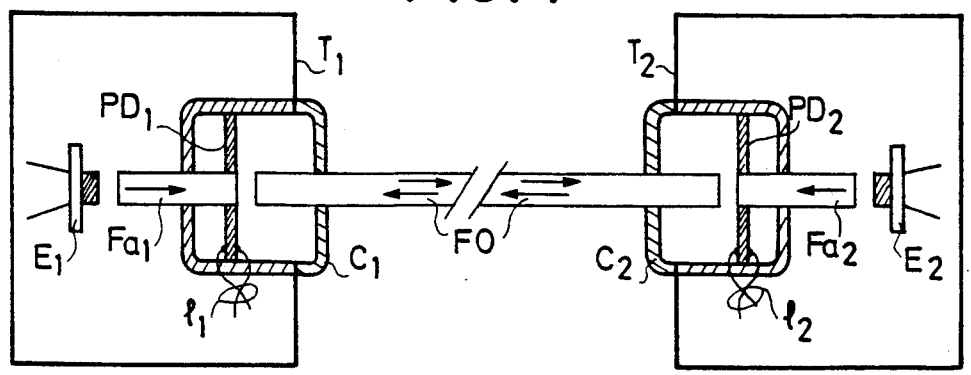
FIG. 4 is a schematic illustration of a system for bidirectional data transmissions by optical fiber in which couplers in accordance with the invention are employed.

FIG. 4 provides a schematic illustration of a simultaneous bidirectional communication system of this type.

As shown in this figure, two stations $T_1$ and $T_2$ communicate with each other by means of an optical-fiber link FO.

Each station comprises a light emitter designated respectively by the references $E_1$ and $E_2$ and optically coupled to the transmission-link optical fiber FO by means of an initiating optical fiber $Fa_1$ and $Fa_2$ respectively.

More specifically, optical coupling is performed by means of couplers which provide an adjustable light-energy extraction rate in accordance with the invention, which are designated by the references $C_1$ and $C_2$, and which constitute detachable connectors.

Referring again to FIG. 3, it will be noted that, in the case of the station $T_1$, the optical fibers FO and $Fa_1$ (FIG. 4) perform the respective functions of the optical fibers F1 and $F_2$ and that the component 1 can be attached to the frame of station $T_1$.

Similarly in the case of station $T_2$, these functions are performed by the optical fibers FO and $Fa_2$.

In accordance with the main feature of the invention, a photodiode $PD_1$, $PD_2$ respectively is placed in each optical coupler $C_1$ and $C_2$, each photodiode $PD_1$, $PD_2$ respectively being fitted on the initiating optical fiber $Fa_1$, $Fa_2$ respectively.

Said photodiodes $PD_1$ and $PD_2$ capture a predetermined fraction of the light generated within the connected station $T_2$, $T_1$ respectively, said fraction being dependent on the adjustment made on the spacing d (FIG. 1) between the opposite end-faces of the initiating optical fibers $Fa_1$ and $Fa_2$ and of the transmission-link optical fiber FO.

To be more specific, light emitters $E_1$ and $E_2$ consist, for example, of electroluminescent diodes of the GaAs (gallium arsenide) type which emit light at a wavelength centered on 0.85 microxeter.

The optical fiber FO is of a common type with a core diaxeter of 85 micrometers and a numerical aperture of 0.2. The attenuation for this type of optical fiber is of the order of 3 db/km at the wavelength of 0.85 micrometer.

The photodiodes can be of the type recalled in the description given earlier with reference to FIG. 3.

In the direction of transmission station $T_1$ to station $T_2$ or "forward transmission" direction, the optical power $P_1$ derived from the source $E_1$ is coupled into the optical fiber FO and, after passing through the two couplers $C_1$ and $C_2$, is detected by the photodiode $PD_2$ in accordance with the preset energy-extraction rate $τ_2$. Said photodiode $PD_2$ generates a current which complies with the following relation:

$$i_2 = A_2 k_2 P_1 \qquad (4)$$

where k is the sensitivity of the photodiode $PD_2$ expressed in $AW^{-1}$ and $A_2$ is the transmission factor of the assembly which conforms to the following relation:

$$A_2 = (1-τ_1) τ_2 A \qquad (5)$$

where A is the transxission factor of the optical fiber FO and of any connections which may be disposed along said optical fiber if this latter is not formed in a single length, and where $τ_1$ and $τ_2$ are the energy-extraction rates defined earlier (relations (1) and (2)) and related to the couplers $C_1$ and $C_2$ respectively.

In the reverse direction of transmission or "return transmission" direction, the relations given above $$i_1 = A_1 k_1 P_2 \qquad (6)$$

and $$A_2 = (1-τ_1) τ_2 A \qquad (7)$$

If the same type of photodiode is employed in stations $T_1$ and $T_2$, the sensitivities $k_1$ and $k_2$ can be identical or at least little different from each other.

An experixental 1-km optical link has been constructed and the data which make it possible to establish an energy balance have been recorded in Table I at the end of this description.

The energy-extraction rate $τ_1$ was set at 0.1 and the energy-extraction rate $τ_2$ was set at 0.9.

The values of optical power detected by the photodiodes $PD_1$ and $PD_2$ make it possible, for example, to provide a videocommunication link of excellent quality between a central station $T_1$ and a subscriber station $T_2$.

In this example of application, the return transmission link serves to carry digital signals of the remote-control type or service signals.

This is a convention approach of the type commonly found in a teledistribution system.

For discriminations between the two directions of transmission, a frequency-spectrum discrimination can be employed.

To this end, the light emitted by the sources $E_1$ and $E_2$ is modulated by signals to be transmitted. In accordance with conventional practice, it is only necessary to modulate the electric supply signals to the light-emitting diodes $E_1$ and $E_2$. The frequency spectra associated with the signals transmitted by the stations $T_1$ and $T_2$ must be separate and distinct. The spectrum associated with the video-type signals transmitted by the central station $T_1$ in the example illustrated is constituted by a broad frequency band of several megahertz or several tens of megahertz if it is desired to transmit a number of video channels whereas the spectrum associated with the remote-control signals transmitted by the subscriber station 2 is very narrow.

The output currents of the photodiodes $PD_1$ and $PD_2$ are transmitted by the connectors $1_1$ to $1_2$ to conventional electronic signal-processing circuits (not shown) comprising electric filters.

Provision is made in station $T_1$ for a filter which is tuned to a narrow band and even to a single frequency and provision is made in station $T_2$ for a widebandpass filter. These arrangexents are well-known to those versed in the art.

Other types of discriminations can be employed such as different wavelengths for "forward" transmissions and "return" transmissions or distinct data codings, for example.

What is claimed is:

1. An optoelectronic coupler for optical fibers of the type involving extraction of an adjustable fraction of light energy of an incident wave carried by a first optical fiber for transmitting said fraction to an optoelectronic detection device and for transmitting all of part of the remaining light energy to a second optical fiber, the end-faces of the first and second optical fibers being placed in oppositely-facing relation in order to be optically coupled, wherein the optoelectronic detection device is a photodiode having the structure of a circular disk pierced by a central passage, said disk being fitted on one end of the second optical fiber and provided with an active annular receiving face located opposite to that end-face of the first optical fiber which is in opposite relation to the end-face of said second optical fiber, said coupler comprising: means for positioning said end-faces in opposite relation at a predetermined distance from each other in such a manner as to ensure that the optoelectronic coupler provides an adjustable energy-extraction rate; a sleeve in the form of a cylinder for maintaining the first optical fiber within said sleeve in a direction which coincides with the axis of symmetry of said cylinder, a component forming a casing comprising an internal cavity in which said sleeve is slidably fitted and with an end-wall pierced by a series of cavities in which the second optical fiber and the photodiode are fixed in such a manner as to ensure that the first and second optical fibers have optic axes which coincide in the oppositely-facing end regions; a cover pierced by a central orifice providing a free passageway for the first optical fiber and fitted over the component which forms a casing to close said internal cavity and cover an end of said sleeve; resilient means placed between the sleeve and the cover for locking said sleeve in said internal cavity; and means for relative positioning of said sleeve and said component which forms a casing.

2. A coupler according to claim 1, wherein the sleeve is pierced by first and second longitudinal cavities placed along an axis parallel to said common axis, the cross-sectional area of the second cavity being smaller than the cross-sectional area of the first cavity, and by a radial cavity provided with a threaded portion for establishing a communication between the first longitudinal cavity and the external wall of the sleeve, and wherein said relative positioning means comprise a piston having an extension in the form of a stud which is smaller in cross-sectional area than said piston, said cross-sectional areas being adapted to the respective cross-sectional areas of the first and second longitudinal cavities in order to permit displacement of the piston in sliding motion along said parallel axis, a bearing force being exerted by the stud of said piston on the component which forms the casing and said piston being provided with a beveled end-face, a spring placed between the piston and the end-wall of the first longitudinal cavity in order to exert a thrust on said piston, and a screw engaged in the threaded portion of the radial cavity in order to exert a bearing force on said beveled face in such a manner as to ensure that the combined actions of said screw and said spring permit adjustment of the distance between the end-faces of said first and second optical fibers.

3. A coupler according to claim 2, wherein the component which forms a casing and the cover are provided with complementary threaded portions for screwing the cover on the component which forms a casing, provision being made in addition for an orifice formed in the wall of said component in order to permit freedom of access to said screw, and wherein the sleeve and the component forming a casing are provided with guiding and position-locating means constituted by a stud rigidly fixed to the sleeve and by a longitudinal guide groove formed in the wall of said component which forms a casing, said groove being formed in a direction parallel to said common axis in which one end of said stud is capable of displacement in sliding motion.

4. A coupler according to claim 1, wherein the resilient means placed between the end-cap and the sleeve are constituted by an O-ring seal.

5. A coupler according to claim 1, wherein the photodiode provided within each coupler is a photodiode of the silicon pin-diode type.

6. A system for bidirectional transmissions by means of an optical-fiber link for the guided transmission of light energy between two stations, each station comprising neans for transmission and reception of light energy, wherein each station comprises an optoelectronic coupler according to claim 5 for providing an optical coupling between the means for transmission and reception of light energy and the optical-fiber link, each coupler being intended to extract a predetermined fraction of the light energy received by said optical-fiber link and the optoelectronic device of each coupler being intended to constitute the means for receiving light energy from each station.

7. A system according to claim 6 wherein, the transmissions between stations being of the dissymmetrical type, the light-energy extraction rates of the two couplers are set at distinct predetermined values.

8. A system according to claim 7, wherein said light-energy transmission means are electroluminescent diodes of the gallium-arsenide type which emit at a wavelength centered on 0.85 micrometer.

* * * * *